Nov. 8, 1932.   C. A. MATSON   1,886,710
REVERSE BRAKE DEVICE
Filed Feb. 18, 1929   2 Sheets-Sheet 1
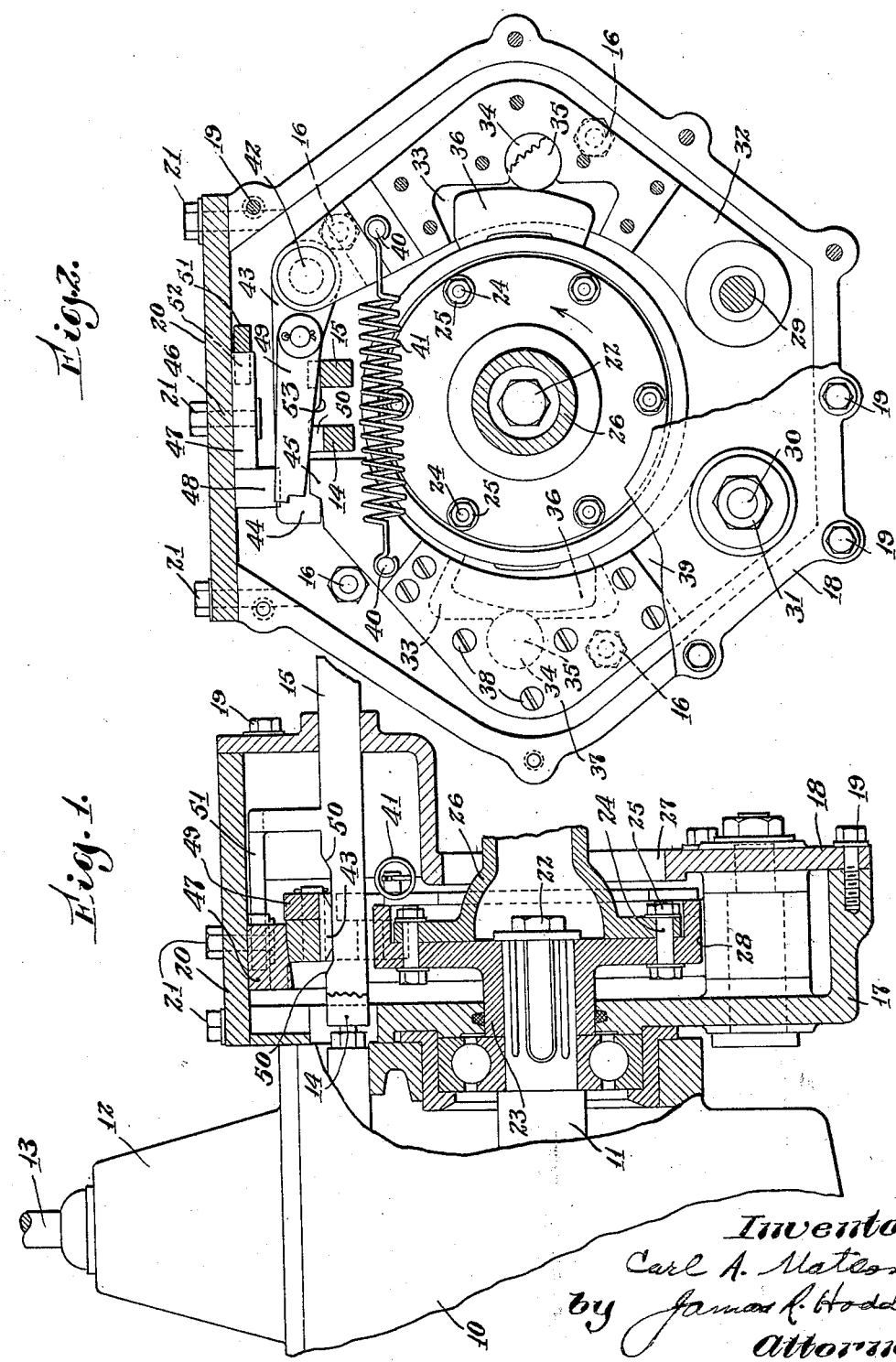
Inventor
Carl A. Matson
by James R. Hodder
Attorney

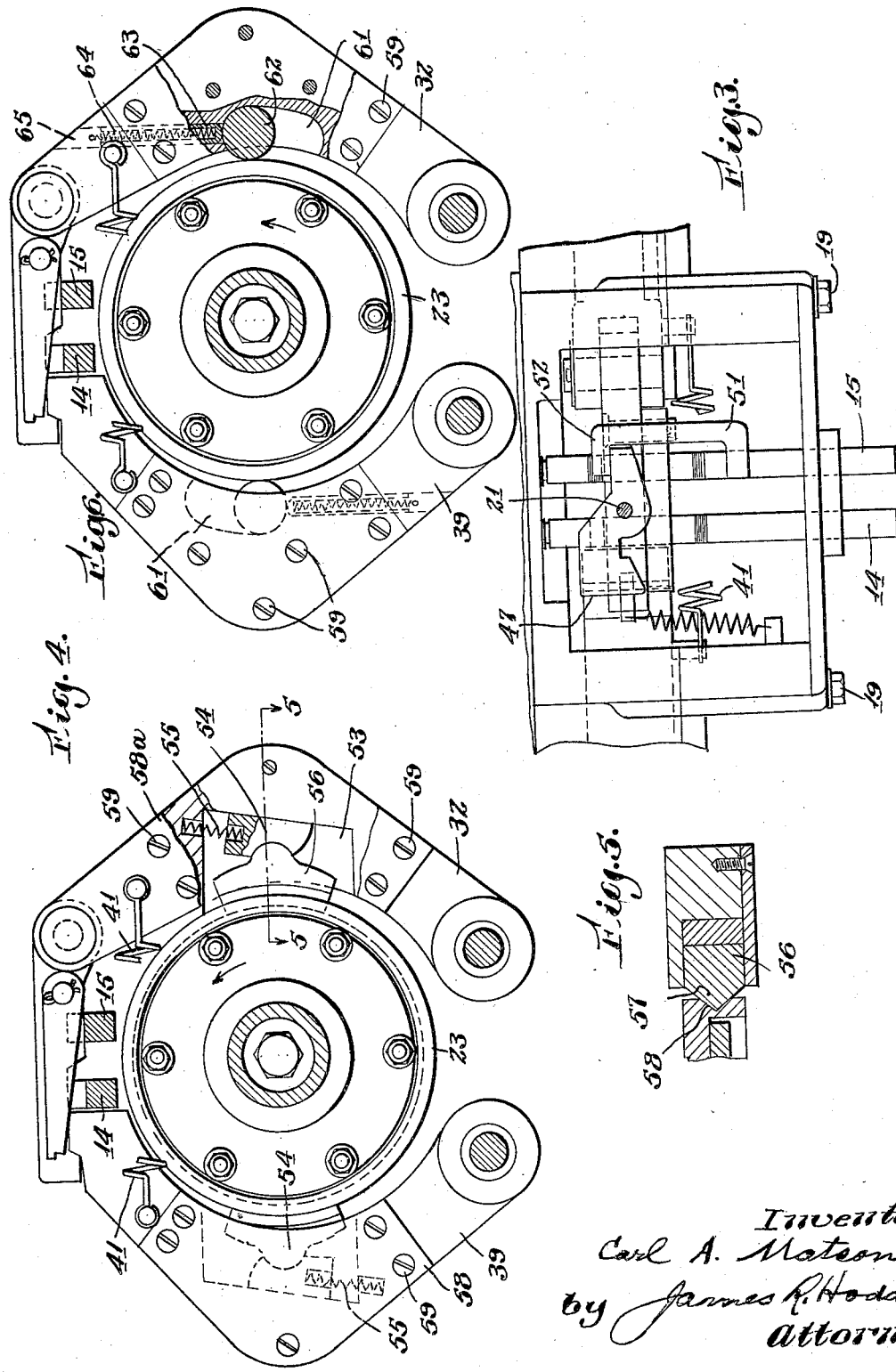

Patented Nov. 8, 1932

1,886,710

UNITED STATES PATENT OFFICE

CARL A. MATSON, OF LYNNFIELD, MASSACHUSETTS, ASSIGNOR TO THE MATSON COMPANY, OF CONCORD, NEW HAMPSHIRE, A CORPORATION OF NEW HAMPSHIRE

REVERSE BRAKE DEVICE

Application filed February 18, 1929. Serial No. 340,668.

My present invention relates to braking mechanism and more particularly to an improved automatic reverse brake or clutch mechanism for automobiles or other mechanical devices.

In the mechanic arts there are numerous situations in which it is necessary that machinery or shafting be capable of rotative movement in one direction only in the normal working of the apparatus, and it has heretofore been impossible to devise means for automatically preventing any reverse rotation. On the contrary, even in devices where it is essential that the device be prevented from a reverse or rotary movement, it is sometimes necessary, particularly when a device is being set up or adjusted, that rotary movement in a reverse direction take place. At the present time there is no mechanism capable of performing such a function and of which I am aware.

In the use of the present day automobile, a dangerous condition frequently arises when it is necessary to stop the vehicle on an incline and where the usual brakes may or may not hold. Regardless of whether such brakes do or do not hold, a serious difficulty arises when it is necessary to start the vehicle in motion after it has been stopped on an incline and this difficulty becomes all the more serious if the vehicle has been stopped on an incline and where there is considerable traffic in close proximity and to the rear. If the driver of the automotive vehicle releases the foot brake to accelerate the engine prior to letting in the clutch, the vehicle will invariably roll back and a possible accident through collision with other cars may occur. Heretofore the only way in which a car could be started under the conditions outlined above was to set the emergency brake, release the foot brake, accelerate the engine, let in the clutch and gradually let out or release the emergency brake. This operation requires considerable skill and is not always feasible.

I am aware that it has been proposed to put one-way clutches on automobiles for the purpose of preventing reverse movement thereof, but none of these devices so far as I am aware operated successfully and in none of such devices is it possible to throw out the reverse prevention mechanism so as to allow a backing up or movement to the rear of the vehicle under certain conditions. These conditions arise where the vehicle, for example, is parked on an incline and with the front wheels in such proximity to a high curbing as to prevent a sufficient amount of forward movement on the part of the vehicle to allow the one-way clutch mechanism to move out of operative position and will also occur where it is desired to back up by means of the usual reverse gear the vehicle to which the device is attached.

In my present invention I have devised means for obviating the difficulties above enumerated and have associated with the propelling shaft or transmission, or both, of the vehicle an automatic reverse brake or clutch mechanism which automatically sets under normal conditions and when the automobile to which it is attached moves backward. The reverse brake or clutch mechanism forming the subject matter of my present invention may be thrown out of action entirely so as to allow movement of the car to the rear and is so designed as to be thrown into a position to be operated when the transmission gearing is thrown into neutral or in any of the forward speeds.

The object of my invention, therefore, is an improved braking or clutch mechanism for automobiles and the like.

In the accompanying drawings illustrating a preferred embodiment of my invention, Fig. 1 is a side elevation partly in section of an automobile transmission gearing and showing one form of my invention in section applied thereto;

Fig. 2 is an end elevation of Fig. 1 with the rear cover removed;

Fig. 3 is a plan view of Fig. 1;

Fig. 4 is an end elevation of a modification;

Fig. 5 is a section on the line 5—5 of Fig. 4, and

Fig. 6 is an end elevation of another modification.

Referring to the drawings, and particularly to Figs. 1, 2 and 3 inclusive, 10 designates a transmission casing provided with the usual transmission gearing and having rotatably mounted therein and extending through the rear end thereof a transmission shaft 11.

Mounted on the top of the transmission casing 10 is a cover 12 in which is pivotally mounted the control lever 13 for operating the slide rods 14 and 15 associated with the change gearing within the casing 10. Attached to the rear of the transmission casing 10 by bolts 16 is a casing 17 open at the rear and provided with a cover 18 that is secured in position by bolts 19. The casing 17 and cover 18 form an enclosure that is open at the top and such open top is provided with a cover plate 20 secured in position by the bolts 21. Secured to the splined end of the transmission shaft 11 by bolt 22 is a recessed flanged member 23 and secured to the rear face of the flanged member 23 by bolts 24 and nuts 25 is a rearwardly extending coupling member 26, such coupling member extending through a cylindrical perforation 27 in the cover plate 18. The outer peripheral edge of the flanged coupling member 23 and designated by the numeral 28 forms a clutching surface for brake members to be hereinafter described.

At the bottom of the casing 17 and on either side of the vertical line passing through the center of the bolt 22, as clearly shown in Fig. 2, are bearing shafts 29 and 30, the outer ends of which are threaded and provided with nuts 31 which bear on the outer surface of the cover plate 18 and hold the shafts rigidly in position. Pivotally mounted on the bearing shaft 29 is the lower end of an arcuate member 32, such member extending upwardly and partially surrounding the flanged coupling member 23. Intermediate the ends of the member 32 is formed a chamber 33 and communicating with such chamber is a cylindrical chamber 34. Within the chamber 34 is a freely rotatable hardened cylindrical member 35, while within the chamber 33 is a substantially wedge shaped clutching or braking member 36. The inner surface of the member 36 is ground cylindrically to engage with the ground cylindrical surface 28 of the member 23 and the outer face of such member 36 is also ground to a cylindrical or curved surface, and such outer surface is engaged by the cylindrical roll 35. Fitting over the chambers 33 and 34 so as to positively hold the members 36 and 35 in their respective chambers, is a cover plate 37 held in position by a plurality of screws 38. Rotatably mounted on the shaft 30 is an arcuate member 39 having generally the shape of the arcuate member 32 but which differs therefrom with respect to certain details of construction at its top end which will be hereinafter described. This member 39 is also provided with a chamber 33 and chamber 34 and within such chambers respectively are located the duplicates of the substantially wedge shaped member 36 and the hardened roll 35, but it will be noted from an inspection of Fig. 2 that such wedge shaped member 36 in the chamber 33 in the member 39 has its smaller end upward. Each of the members 32 and 39 are provided with rearwardly extending posts 40 to which are attached the ends of a coil spring 41, such coil spring tending to bring the upper ends of such members 32 and 39 toward each other and, therefore, to bring the inner surface of the wedge shaped members 36 into engagement with the ground peripheral face 28 of the flange coupling member 23. The normal direction of rotation of the transmission shaft 11 and, therefore, of the flanged coupling member 23 is in the direction of the arrow shown in Fig. 2, and in such rotation it will be obvious that there is a tendency on the part of the wedge shaped members 36 to ride out of engagement with both the ground peripheral face 28 of the flanged coupling member 23 and the hardened rolls 35.

The upper end of the member 32 is provided with a transverse shaft 24 on which is pivotally mounted one end of a latching lever 43. The free end of such latching lever 43 is provided with a latch 44 which co-operates with a latch 45 formed on the upper end of the member 39. When the flanged coupling member 23 is rotating in the direction of the arrow shown in Fig. 2, the wedge shaped members 36 are forced out of locking or clutching position and the spring 41 will bring the upper ends of the members 32 and 39 toward each other sufficiently for the latch 44 to engage with the latching member 45. Arranged in the cover plate 20 is a vertical shaft 46, on which and in engagement with the under face of the cover 20 is a safety latch device 47 which is provided on its under face and on one end with an enlargement 48 that is normally in engagement with the upper face of the free end of the latching member 43, when such latching lever is in the position shown in Fig. 2, which is the locking position, and prevents unauthorized separation of the latch member 44 and latch 45. Pivotally mounted on the latching lever 43 is a locking lever 49 adapted to engage with the upper inner end of the member 39, as will be hereinafter described. Each of the sliding bars 14 and 15 are provided with cam faces 50 that are adapted to engage with the under face of the locking lever 49 and move the same upwardly about its pivot so as to free the locking end thereof from the upper inner end of the member 39 and allow, under such circumstances, the spring 41 to function to bring the free ends of the members 32 and 39 toward each other and into the position shown in Fig. 2.

In the sliding bar 15 is arranged an upwardly and forwardly projecting member 51, and on such member is formed integrally therewith a laterally projecting portion 52 that lies normally in front of one end of the safety latch 47. The under edge or face of the locking lever 43 is provided with a portion 53 that lies in the path of movement of the forward wedge 50 on the slide bar 15. The relation of the forward wedge or cam surface 50 of the sliding bar 15 with respect to the portion 53 of the locking lever 43 and the laterally extending portion 52 on the laterally and forwardly extending portion 51 on the lever 15 is such that the rear face of the laterally projecting member 52 will engage with one end of the safety latch 47 so as to move the projection 48 thereon out of the path of movement of the locking lever 43 before the cam surface 50 engages with the portion 53 on the locking lever 43 to lift the same upwardly and remove the latch member 44 out of engagement with the latch 45.

The mechanism just described in connection with the slide bar 15, which is the bar for throwing the reverse gearing in the transmission casing 10 into action, makes it possible to move the vehicle to which the device is attached rearwardly without the reverse mechanism or clutch operating to prevent rearward movement and the movement of either of the slide bars 14 and 15 into any of the positions to bring the forward speeds of the transmission mechanism into action, releases the locking lever 49 and brings the locking or clutching mechanism again into operative position.

Assuming that the device above described has been constructed and arranged as shown in Figs. 1, 2 and 3 and that the transmission shaft 11 is rotating in the direction of the arrow shown in Fig. 2, then it will be obvious that such rotative movement will have a tendency to move the wedging members 36 out of wedging relation with the peripheral face 28 of the coupling member 23 and the rolls 35. If it is assumed now that the motor vehicle to which the device is attached is brought to rest with either of the forward speeds in operative position, or with none of the forward speeds in operative position, and that such vehicle is brought to rest on an incline, obviously there will be a tendency on the part of the vehicle to roll backward, thus rotating the transmission shaft 11 and coupling member 23 in the reverse direction to that indicated by the arrow shown in Fig. 2. The members 36 being in engagement with the peripheral face 28 of such coupling member 23 will be forced against the rolls 35 and the wedging action produced is amply sufficient under all conditions of service to positively lock the transmission shaft 11 from retrograde movement or a movement in the direction opposite to that of the arrow shown in Fig. 2. Should, however, it be desired to reverse the vehicle to which the device is attached by means of the usual reversing mechanism, the operator, by properly manipulating the lever 13, will move the slide bar 15 rearwardly or to the right, as shown in Fig. 1. Under these circumstances the portion 52 of the laterally and forwardly extending member 51 will engage with one end of the safety latch 47 and will move the portion 48 thereon out of the upward path of movement of the free end of the locking lever 43. Continued rearward movement of the slide bar 15 will cause the forward cam surface 50 thereof to engage with the portion 51 on the under face of the locking lever 43 and such locking lever 43 will be rotated in a clockwise direction so as to move the member 44 out of engagement with the member 45, and under these circumstances the transmission shaft 11 may be moved in a direction opposite to that indicated by the arrow in Fig. 2. Under these circumstances the wedge members 36 will be moved toward wedging position but no wedging action will take place as the spring 41 will give sufficiently to allow the upper ends of the members 32 and 39 to spread apart until the latch end of the lever 49 engages with the upper inner face of the member 39, when such members will be held apart and prevent any locking action between the rolls 35, wedging members 36 and the peripheral face 28 of the coupling member 23.

Referring now to Fig. 4, wherein is shown a modification of the device illustrated in Figs. 1, 2 and 3, I have provided in the members 32 and 39 substantially rectangular chambers 53 in each of which is slidably mounted a rocker bed 54, the one in association with the member 32 being forced downwardly by spring 55, while the one in association with the member 39 is forced upwardly by a spring 55. Mounted for rocking movement on the rocking beds 54 are braking and clutching members 56, the inner faces thereof being wedge shaped, as indicated at 57 in Fig. 5, and such wedge faces fit in a circumferentially arranged wedge groove 58 formed in the periphery of the coupling member 23. The operation of this modification is identical with that of the form shown in Figs. 1, 2 and 3 and it is believed that a detailed description of such operation is not necessary. The chambers 53 are covered by cover plates 58a secured to the members 32 and 39 by screws 59.

Referring now to Fig. 6, wherein is shown a still further modification of my invention, the members 32 and 39 are provided with substantially wedge shaped chambers 61, in each of which is rotatably and slidably mounted a roller 62. Such roller 62 is normally urged toward the wedging or smaller portion of the chamber 61 by a plunger 63 cooperating with a spring 64 in a passage 65 in the members 32 and 39. The chambers 61 together with the peripheral face 28 of the coupling member 23 forms a wedging chamber into the smaller end of which the rolls 62 are driven, should it be attempted to rotate the transmission shaft 11 in a direction opposite to that indicated by the arrow in Fig. 6, unless, as has been explained above with relation to the construction illustrated in Figs. 1, 2 and 3, the locking mechanism is purposely thrown out of action by the reverse slide bar 15.

Various other forms of my invention will suggest themselves to those skilled in the art and I do not wish to be limited other than as pointed out in the appended claims.

Having thus described my invention what I claim as new is:

1. In a device of the kind described, the combination of a shaft, a member fixed thereto and rotatable therewith, a freely pivoted member partially surrounding the first said member and having a chamber formed therein, and a wedging device in said chamber normally operable to engage said rotatable member to prevent rotative movement thereof in one direction only.

2. In a device of the kind described, the combination of a rotatable member, a pivotally mounted member associated therewith and provided with a chamber, a rotatably mounted roll in said chamber, a wedging device normally in engagement with the roll and with the rotative member, and yielding means for holding the roll, wedging member and rotatable member in engagement with each other.

3. In a device of the kind described, the combination of a rotatable member, a pivotally mounted member associated therewith and provided with a chamber, a rotatable roll associated with said chamber, a wedging member located in said chamber and normally engaging with the rotatable roll and with the rotating member, said wedging member so positioned in the chamber as to permit rotative movement of the rotatable member in one direction only, and means for yieldingly holding the wedging member in engagement with the rotatable roll and rotatable member simultaneously.

4. In a device of the kind described, the combination of a rotatable member, a pair of freely pivoted members associated therewith and partially surrounding the rotatable member, a wedging device associated with each pivotally mounted member and normally in engagement with the rotatable member and so positioned as to permit rotative movement of the rotatable member in one direction only, means for yieldingly holding the wedging members in engagement with the rotatable member, and means associated with the rotatable member for throwing the wedging members out of action, whereby rotative movement of the rotatable member in the reverse direction is permitted.

5. In a device of the kind described, the combination of a rotatable member, pivotally mounted members associated therewith and partially surrounding the rotatable member, wedging members slidably mounted in the pivoted members, said wedging members being normally in engagement with the rotatable member, means for yieldingly holding the wedging members in engagement with the rotatable member, means associated with the rotatable member for placing the wedging members in inoperative position, and means associated with the pivoted members for maintaining the wedging members out of wedging position at will.

6. In a device of the kind described, the combination of a shaft, a member fixed thereto and rotatable therewith, a freely pivoted member associated therewith and having a chamber formed therein, and a wedging device of less length than said chamber slidable therein and normally operable to engage said rotatable member to prevent rotative movement thereof in one direction only.

7. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, and resilient means affixed to said pivoted members at the opposite side of the center of said rotatable member to normally draw the free ends of said pivoted members toward each other.

8. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, and resilient means affixed to said pivoted members at the opposite side of the center of said rotatable member and adjacent to the free ends of said pivoted members to normally draw the free ends of said pivoted members toward each other.

9. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, and cooperating latch members carried by the free ends of the pivoted members to hold the free ends of said pivoted members in locked position.

10. In a device of the kind described, a rotatable member, a pair of pivotally mounted members partially surrounding the rotatable member, the pivot point of said members bars being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, cooperating latch members carried by the free ends of the pivoted members to hold the free ends of said pivoted members in locked position, and means to engage one of said latch members to retain said latch members in their locked engagement.

11. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, cooperating latch members carried by the free ends of the pivoted members to hold the free ends of said pivoted members in locked position, means to engage one of said latch members to retain said latch members in their locked engagement, and means to release said latch members from locked engagement.

12. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, cooperating latch members carried by the free ends of the pivoted members to hold the free ends of said pivoted members in locked position, means to engage one of said latch members to retain said latch members in their locked engagement, and cam operated means to release said latch members from locked engagement.

13. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, and a member associated with one of said pivoted members to hold said pivoted members in unlocked position.

14. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, a latch associated with one of said pivoted members to hold said pivoted members in unlocked position, and means to release said latch whereby the ends of said pivoted members may be drawn together by said resilient means.

15. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, and resilient means affixed to said pivoted members at the opposite side of the center of said rotatable member to normally draw the free ends of said pivoted members toward each other, a latch pivotally mounted adjacent to the end of one of said pivoted members, a latch portion on the free end of the other pivoted member adapted to be engaged by said latch to retain said pivoted members in locked position.

16. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, a latch pivotally mounted adjacent to the end of one of said pivoted members, a latch portion on the free end of the other pivoted member adapted to be engaged by said latch to retain said pivoted members in locked position, and means engaging said latch to hold same in locked position.

17. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, a latch pivotally mounted adjacent to the end of one of said pivoted members, a latch portion on the free end of the other pivoted member adapted to be engaged by said latch to retain said pivoted members in locked position, and a second latch pivotally mounted on said first latch and adapted to engage the free end of the other pivoted member to hold said pivoted members in unlocked position.

18. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, a latch pivotally mounted adjacent to the end of one of said pivoted members, a latch portion on the free end of the other pivoted member adapted to be engaged by said latch to retain said pivoted members in locked position, means engaging said latch to hold same in locked position, and means to release said latch engaging means.

19. In a device of the kind described, a rotatable member, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, resilient means affixed to said pivoted members at the opposite side of the center of said rotatable member to normally draw the free ends of said pivoted members toward each other, a latch pivotally mounted adjacent to the end of one of said pivoted members, a latch portion on the free end of the other pivoted member adapted to be engaged by said latch to retain said pivoted members in locked position, means engaging said latch to hold same in locked position, and cam operated means to release said latch engaging means.

20. In a device of the kind described, a rotatable member having a circumferential V-shaped groove therein, a pair of pivotally mounted members partially surrounding the rotatable member, the pivot point of said members being at one side of the center of said rotatable member, a wedging device associated with each pivotally mounted member and so positioned as to permit rotative movement of the rotatable member in one direction only, said wedging device having a portion adapted to seat in said V-shaped groove.

21. In a device of the kind described, the combination of a rotatable member, a pivotally mounted member associated therewith and provided with a chamber, said pivoted member being also provided with a recess communicating with said chamber, a rotatable roll in said recess, and a wedging device in said chamber normally in engagement with the roll and with the rotative member.

22. In a device of the kind described, the combination of a rotatable member, a pivotally mounted member associated therewith and provided with a chamber, said pivoted member being also provided with a recess communicating with said chamber, a rotatable roll in said recess, a wedging device in said chamber normally in engagement with the roll and with the rotative member, and yielding means for holding the roll, wedging member, and rotatable member in engagement with each other.

In testimony whereof, I have signed my name to this specification.

CARL A. MATSON.